US012590635B2

(12) United States Patent
Evrard et al.

(10) Patent No.: US 12,590,635 B2
(45) Date of Patent: Mar. 31, 2026

(54) METAL END CAP SEAL

(71) Applicant: Schlumberger Technology Corporation, Sugar Land, TX (US)

(72) Inventors: Thomas Evrard, Clamart (FR); Steve Wattelle, Clamart (FR); Richard Windslow, Rosharon, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/834,708

(22) PCT Filed: May 19, 2023

(86) PCT No.: PCT/US2023/022934
§ 371 (c)(1),
(2) Date: Jul. 31, 2024

(87) PCT Pub. No.: WO2023/225318
PCT Pub. Date: Nov. 23, 2023

(65) Prior Publication Data
US 2025/0129849 A1      Apr. 24, 2025

Related U.S. Application Data

(60) Provisional application No. 63/365,002, filed on May 19, 2022.

(51) Int. Cl.
*F16J 15/12* (2006.01)
*E21B 33/12* (2006.01)
*F16J 15/16* (2006.01)

(52) U.S. Cl.
CPC ......... *F16J 15/128* (2013.01); *E21B 33/1216* (2013.01); *F16J 15/12* (2013.01);
(Continued)

(58) Field of Classification Search
CPC .......... F16J 15/12; F16J 15/121; F16J 15/122; F16J 15/123; F16J 15/125; F16J 15/128;
(Continued)

(56) References Cited

U.S. PATENT DOCUMENTS 4,381,114 A * 4/1983 Vanderford, Jr. ....... E21B 33/04
285/96
4,496,162 A * 1/1985 McEver .............. E21B 33/1216
166/123
(Continued)

FOREIGN PATENT DOCUMENTS

WO        2004011826 A1      2/2004
WO     WO-2010065012 A1 *  6/2010 ............. E21B 33/04
(Continued)

OTHER PUBLICATIONS

Search Report and Written Opinion of International Application No. PCT/US2023/022934 dated Sep. 1, 2023, 11 pages.

*Primary Examiner* — Nicholas L Foster
(74) *Attorney, Agent, or Firm* — Jeffrey D. Frantz

(57) ABSTRACT

A metal end cap seal including metal end caps bonded to a central elastomer component is provided. In one embodiment, a metal end cap seal includes two metal end caps and a central elastomer component. The central elastomer component can be bonded to the metal end caps. The elastomer can include FFKM. Additional systems, devices, and methods are also disclosed.

19 Claims, 6 Drawing Sheets

(52) U.S. Cl.
CPC ......... *E21B 2200/01* (2020.05); *F16J 15/125* (2013.01); *F16J 15/166* (2013.01)

(58) Field of Classification Search
CPC .. F16J 15/166; E21B 33/1216; E21B 2200/01
See application file for complete search history.

(56) References Cited

U.S. PATENT DOCUMENTS

| | | | | |
|---|---|---|---|---|
| 6,948,715 | B2 * | 9/2005 | Taylor | F16J 15/48 |
| | | | | 277/331 |
| 7,740,248 | B2 * | 6/2010 | Keene | F16J 15/164 |
| | | | | 277/609 |
| 8,201,832 | B2 * | 6/2012 | Kocurek | E21B 33/03 |
| | | | | 277/609 |
| 8,800,648 | B2 * | 8/2014 | Kocurek | F16J 15/166 |
| | | | | 166/179 |
| 9,120,261 | B2 * | 9/2015 | Hench | B29C 43/027 |
| 9,617,818 | B2 * | 4/2017 | Kocurek | E21B 33/04 |
| 9,835,252 | B2 * | 12/2017 | Kocurek | F16J 15/104 |
| 9,863,536 | B2 * | 1/2018 | Cheng | F16J 15/121 |
| 10,001,216 | B2 * | 6/2018 | Puccio | F16J 15/128 |
| 10,753,170 | B2 * | 8/2020 | Nguyen | E21B 33/1216 |
| 11,105,178 | B2 * | 8/2021 | Charles | F16L 55/17 |
| 2003/0209857 | A1 * | 11/2003 | Keene | F16J 15/128 |
| | | | | 277/336 |
| 2003/0209861 | A1 * | 11/2003 | Keene | E21B 33/1216 |
| | | | | 277/603 |
| 2003/0209862 | A1 * | 11/2003 | Keene | E21B 33/1216 |
| | | | | 277/607 |
| 2004/0017047 | A1 * | 1/2004 | Taylor | F16J 15/164 |
| | | | | 277/434 |
| 2005/0062235 | A1 * | 3/2005 | Keene | E21B 33/04 |
| | | | | 277/603 |
| 2009/0230632 | A1 | 9/2009 | Petrash et al. | |
| 2010/0194049 | A1 * | 8/2010 | Kocurek | F16J 15/104 |
| | | | | 277/627 |
| 2011/0266752 | A1 | 11/2011 | Kocurek et al. | |
| 2012/0248703 | A1 * | 10/2012 | Kocurek | F16J 15/121 |
| | | | | 277/343 |
| 2013/0207312 | A1 * | 8/2013 | Hench | B29C 43/027 |
| | | | | 264/313 |
| 2014/0203516 | A1 * | 7/2014 | Kocurek | F16J 15/166 |
| | | | | 277/399 |
| 2016/0298767 | A1 * | 10/2016 | Puccio | F16J 15/128 |
| 2017/0191565 | A1 * | 7/2017 | Cheng | E21B 33/00 |

FOREIGN PATENT DOCUMENTS

| | | |
|---|---|---|
| WO | 2013122647 A1 | 8/2013 |
| WO | 2016109783 A2 | 7/2016 |

* cited by examiner

METAL END CAP SEAL

CROSS-REFERENCE TO RELATED APPLICATIONS

This application is a National Stage Entry of International Application No. PCT/US2023/022934, filed May 19, 2023, which claims benefit of U.S. Provisional Patent Application No. 63/365,002 filed May 19, 2022, which is incorporated by reference herein in its entirety.

BACKGROUND

Field

The present disclosure generally relates to metal end cap seals.

Description of the Related Art

In oil and gas wells, various wellbore or completion components can be connected together via seals and/or connectors, such as a Bottom Hole Disconnect System (BHDS), Wet Disconnect Tool or System (WDT), or Hydro-Electric Wet Mate (HEWM). Various metal end cap seal designs are available.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment of the present disclosure, a metal end cap seal includes a central elastomer component and two metal end caps. The central elastomer component is bonded to the metal end caps. The elastomer can include FFKM in some instances.

In another embodiment, a metal end cap seal includes two annular metal end caps bonded to opposite axial ends of an annular elastomer body. Each of the two metal end caps includes an inner arm forming a portion of an inner surface of the metal end cap seal, an outer arm forming a portion of an outer surface of the metal end cap seal, and a base connecting the inner arm to the outer arm. The inner arm and the outer arm can be parallel to one another when the metal end cap seal is in a relaxed state.

In a further embodiment, a method includes providing a metal end cap seal including an annular elastomer body and two annular metal end caps bonded to opposite axial ends of the annular elastomer body, each of the two metal end caps including an inner arm forming a portion of an inner surface of the metal end cap seal, an outer arm forming a portion of an outer surface of the metal end cap seal, and a base connecting the inner arm to the outer arm. The inner arm and the outer arm are parallel to one another when the metal end cap seal is in a relaxed state. The method also includes installing the metal end cap seal into an annular space between an inner oilfield component and an outer oilfield component.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION OF SPECIFIC EMBODIMENTS

Figure 2:
FIG. 2 is an elevational view of the metal end cap seal of FIG. 1 in accordance with one embodiment.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Certain embodiments of the present disclosure relate to a metal end cap seal having a geometry capable of bonding a large volume of elastomer to the metal end caps. The elastomer can be of various types, including HNBR (hydrogenated nitrile butadiene rubber), FEPM (tetrafluoroethylene propylene, of which AFLAS® is one example), FKM (fluorocarbon rubber), or FFKM (perfluoroelastomer). Typically, FFKM is resistant to adhering properly to any part, either metal or plastic. Metal end cap seals of some embodiments of the present disclosure have design features that advantageously enhance bonding of FFKM to the metal end caps and advantageously prevent or inhibit shearing of the seal, e.g., in harsh environments and/or due to exposure to high differential pressure. The present metal end cap seals can be used not just in the oil and gas industry (e.g., in BHDS, WDT, or HEWM applications), but also for other energy applications (e.g., carbon capture and storage, hydrogen, geothermal) and in other industries as well, such as the subsea mining, aviation, or automotive industries.

Metal end cap (MEC) seals have long been used in the oil and gas industry. Such metal end cap seals can be annular seals with an elastomer body bonded to metal end caps. Generally, such metal end cap seals can provide excellent extrusion resistance, hence these seals are often used for high-temperature, high-pressure applications. One of the limiting factors in MEC seal design is material compatibility, in that certain elastomers struggle to bond to the metal end caps. Metal to elastomer adhesion relies on a strong chemical bond; however, for some applications (e.g., oil and gas applications) certain elastomer compounds (e.g., FFKM) are developed to be extremely chemically resistant. This can mean that the most chemical-resistant compounds struggle to form an effective bond to metal surfaces. This presents a dichotomy in that, in some instances, strong chemical resistance is desired for long-term seal-ability, but stronger chemical resistance may then prevent the elastomer from properly bonding to the metal end caps of conventional metal end cap seals.

In some conventional metal end cap seals, the elastomer is an HNBR or similar compound that provides a balance of chemical resistance with sufficient bonding to metals. But HNBR may not have sufficient chemical resistance for some applications. While FFKM exhibits greater chemical resistance than HNBR, use of an extremely chemical-resistant compound such as FFKM has typically ruled out MEC seals due to manufacturing constraints (e.g., related to insufficient bonding of the elastomer to conventional metal end caps to withstand a given use case). In accordance with certain embodiments, the present disclosure provides an MEC seal geometry that allows the MEC seal to be successfully formed with various elastomers, including extremely chemical-resistant elastomers such as FFKM. In at least some embodiments, in comparison to a conventional MEC seal design, this MEC seal geometry limits strain along the bond interface between the elastomer and metal end cap to facilitate retention of the metal end cap to the elastomer.

Figure 1:
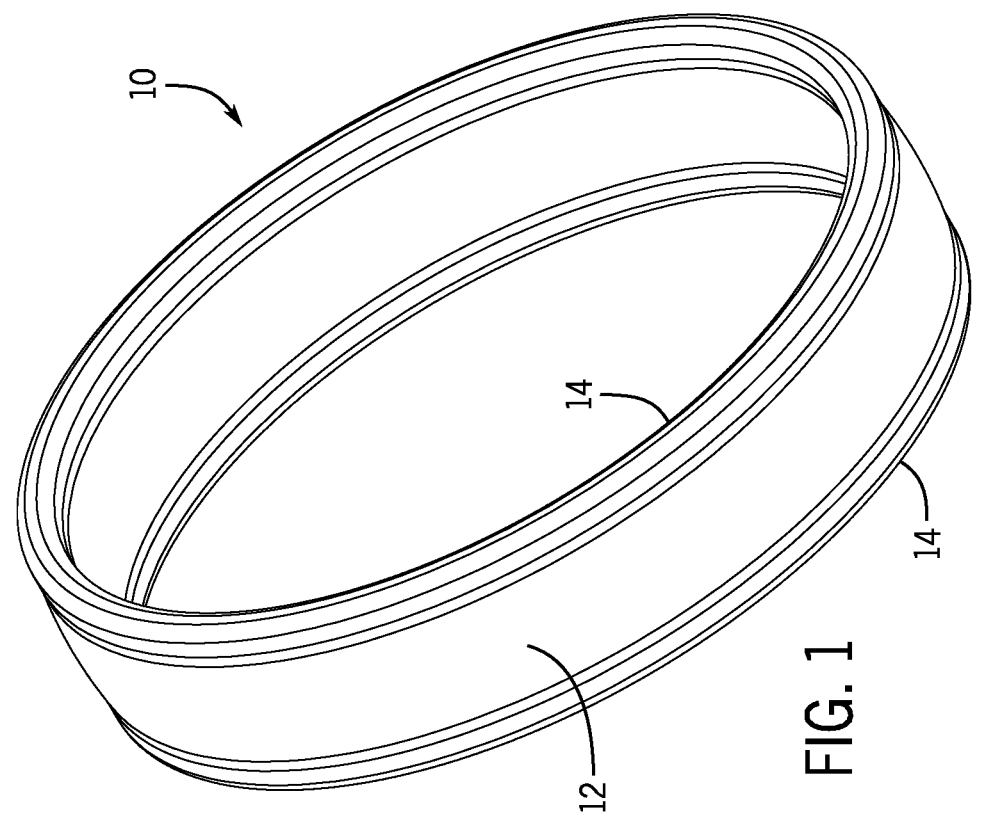
FIG. 1 is a perspective view of a metal end cap seal having an elastomer body bonded to metal end caps in accordance with one embodiment of the present disclosure.

Turning now to the figures, such a metal end cap seal 10 is depicted in FIGS. 1 and 2 in accordance with one embodiment. The seal 10 is an annular seal having a central elastomer body 12 coupled to metal end caps 14. The metal end caps 14 may be coupled to the elastomer body 12 in any suitable manner; in some instances, the metal end caps 14 are bonded to the elastomer body 12 in a mold. In some configurations, the elastomer is FFKM. Other elastomers, such as HNBR, FEPM, or FKM could also or instead be used for the body 12. As discussed in greater detail below, the geometry of the seal 10 can be designed to enhance or maintain bonding of the elastomer body 12 to the metal end caps 14. The elastomer 12 can be shaped to suit the needs of a WDT stinger and receptacle and to improve or maximize performance. The metal end caps 14 can be made from various metals, for example, a nickel alloy. As shown, the metal end caps 14 can each be ring shaped. The metal end caps 14 can have U- or C-shaped cross-sections or any other suitable shape.

Figures 3, 4:
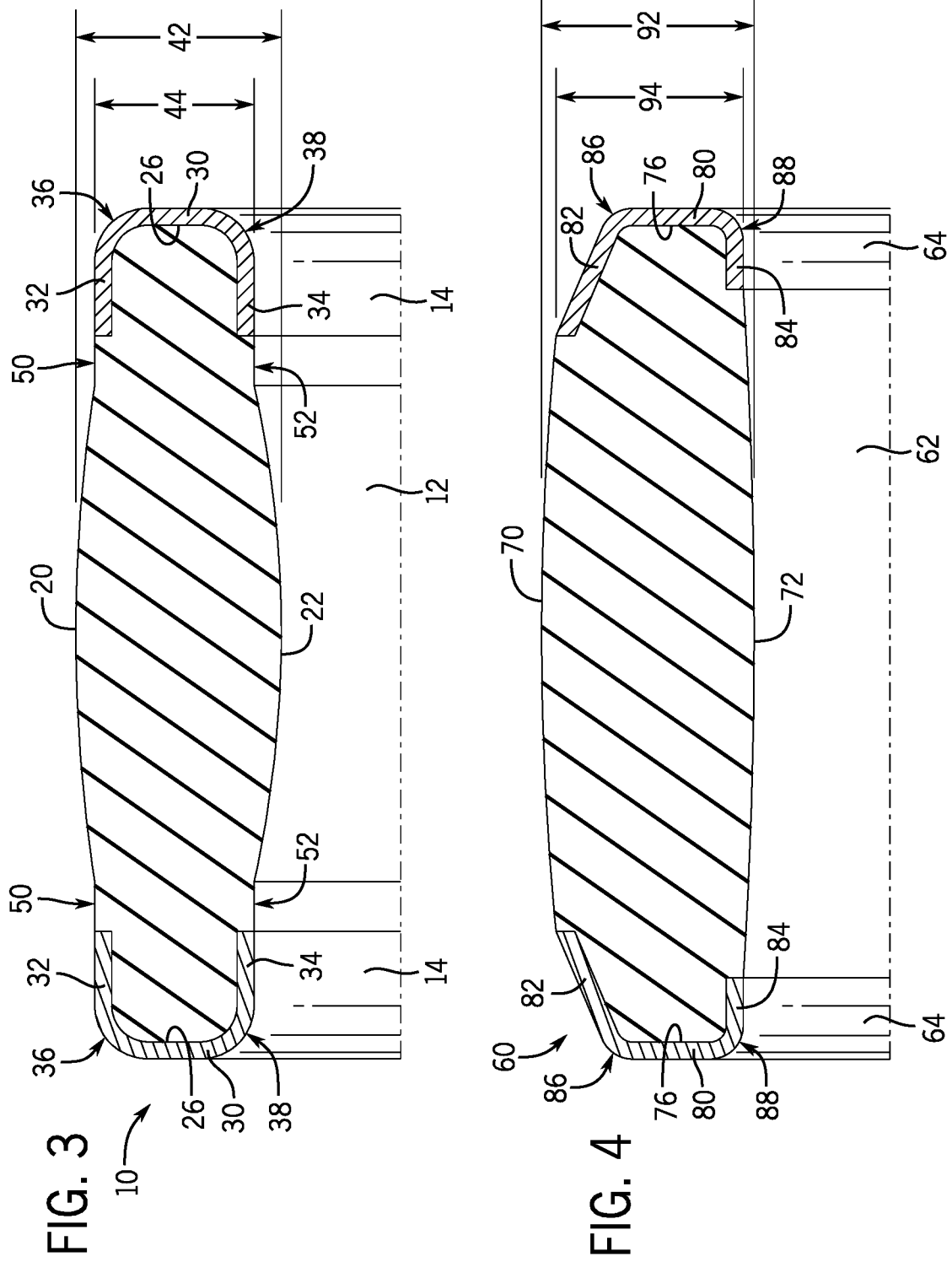
FIG. 3 depicts a partial cross-section of the metal end cap seal of FIGS. 1 and 2 and shows certain features of the elastomer body and the metal end caps in accordance with one embodiment.
FIG. 4 depicts a partial cross-section of a metal end cap seal with a more conventional design.
Figure 5:
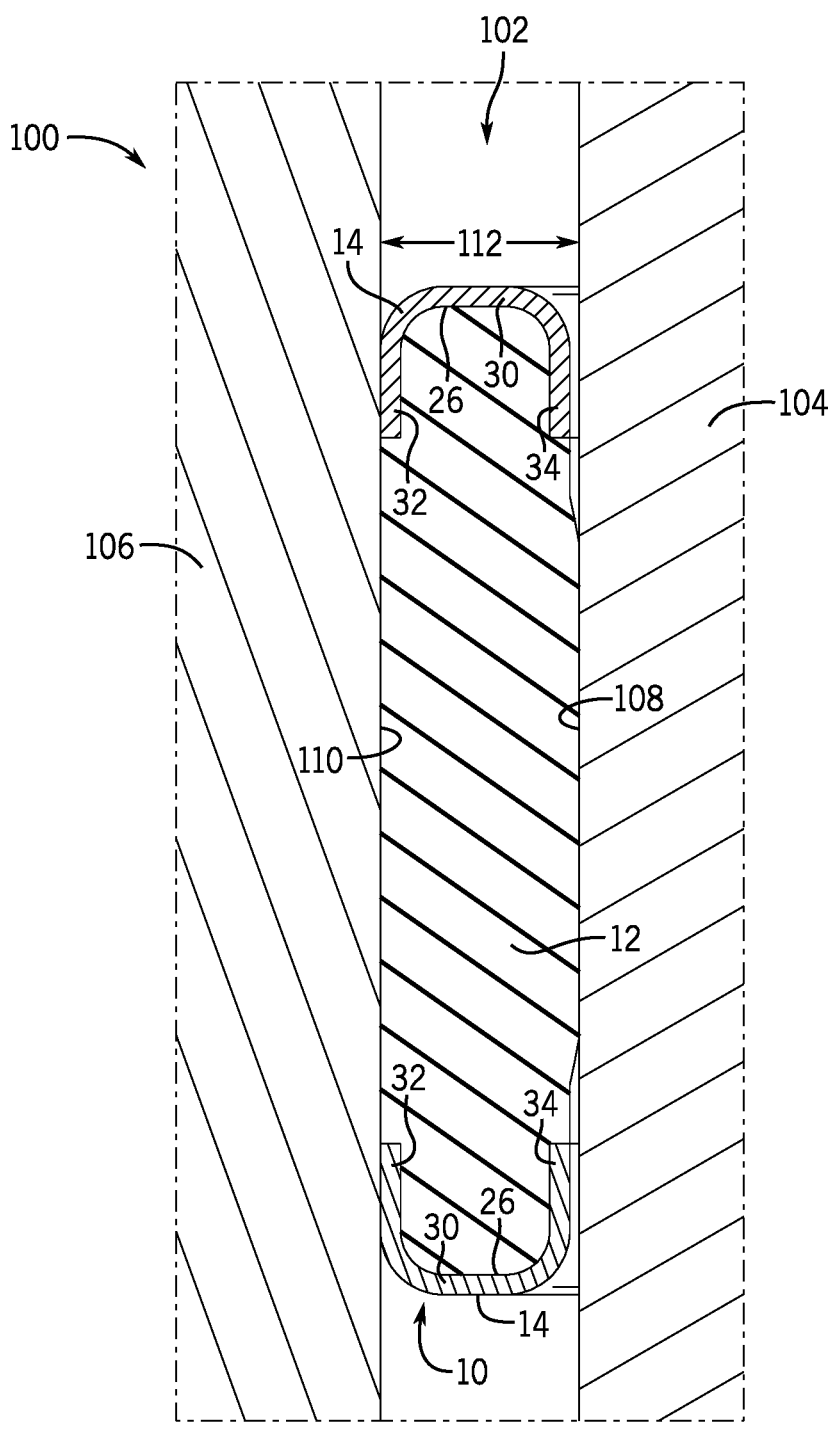
FIG. 5 depicts an apparatus having the metal end cap seal of FIGS. 1-3 installed in an annular space between inner and outer components in accordance with one embodiment.

Additional details of the seal 10 are illustrated in FIG. 3, which shows an axial cross-section of a portion of the seal 10. As depicted in FIG. 3, the seal 10 includes a radially outward facing surface, which includes a convex outer surface 20 of the elastomer body 12, and a radially inward facing surface, which includes a convex inner surface 22 of the elastomer body 12. The seal 10 can be installed in an annular space so that the outer surface 20 of the elastomer body 12 seals against an outer component and the inner surface 22 of the elastomer body 12 seals against an inner component, such as shown in FIG. 5 and discussed in more detail below.

The elastomer body 12 is coupled to interior surfaces of the metal end caps 14 along bond interfaces 26. As shown in FIG. 3, each metal end cap 14 includes an outer arm 32 that is part of the outer surface of the seal 10, an inner arm 34 that is part of the inner surface of the seal 10, and a base portion 30 connecting the outer arm 32 to the inner arm 34. Each of the metal end caps 14 is depicted with a first bend 36 from the base 30 to the outer arm 32 (which extends linearly from the first bend 36 to a distal end of the metal end cap 14) and a second bend 38 from the base 30 to the inner arm 34 (which extends linearly from the second bend 38 to the other distal end of the metal end cap 14). In at least some embodiments, the outer arms 32 and the inner arms 34 are parallel (or substantially parallel) to each other and perpendicular (or substantially perpendicular) to a radius of the seal 10 when the seal 10 is in a relaxed state, such as shown in FIGS. 1-3. Further, the body of each metal end cap 14 may have a uniform thickness along its body across the inner arm 34, the base 30, and the outer arm 32, such as shown in FIG. 3.

The elastomer body 12 is depicted in FIG. 3 as having a radial width 42, and the metal end caps 14 are depicted as having radial widths 44. In some instances, including that depicted in FIG. 3, the metal end caps 14 are separated from the convex surfaces 20 and 22 of the elastomer body 12 by transition surface portions 50 and 52 of the elastomer body 12, which are discussed in greater detail below.

Several features of the seal 10 may be better understood through comparison with a conventional metal end cap seal, an example of which is depicted as seal 60 in FIG. 4. This seal 60 is an annular seal with an elastomer body 62 bonded to metal end caps 64. The elastomer body 62 includes an outer surface 70 and an inner surface 72. The metal end caps 64 are bonded to the elastomer body 62 along bond interfaces 76 and include base portions 80 joining outer arms 82 and inner arms 84 via bends 86 and 88, respectively. It will be appreciated that the geometries of the elastomer body 62 and the metal end caps 64 may vary between different conventional metal end cap seals. As depicted in FIG. 3, the elastomer body 62 has a radial width 92, and the metal end caps 64 each have a radial width 94.

The metal end caps 64 are intentionally designed to collapse inward with the elastomer body 62 as the seal 60 is squeezed into position (e.g., into an annular space between components). This collapsing generates strains at the bond interfaces 76 but, in the case of elastomers with high bond strength (e.g., HNBR), these strains may be acceptable and may not lead to de-bonding of the elastomer body 62 from metal end caps 64. By collapsing the metal end caps 64, their spring memory (a bias to return to their un-collapsed state) acts to push the metal end caps 64 against the opposing sealing surfaces, actively working to block an extrusion path. This design philosophy may be effective but may not be compatible with elastomers that are more difficult to bond to, such as FFKM. In the case of these difficult-to-bond elastomers, the strains generated by metal end caps collapsing may be sufficient to cause the elastomer to de-bond.

In contrast, the seal 10 includes various features to limit strains generated at the bond interfaces 26. For instance, the outer arms 32 and inner arms 34 of the metal end caps 14 run parallel (or substantially parallel) to opposing sealing surfaces such that the metal end caps 14 do not collapse during installation of the seal 10, which limits the stress put on the bond interfaces 26 as the seal 10 is squeezed into place between the opposing sealing surfaces. By way of example, FIG. 5 depicts an apparatus 100 in which the seal 10 is installed in an annular bore 102 between an inner component 104 and an outer component 106. In at least some instances, the inner and outer components 104 and 106 are parts of a BHDS, WDT, or HEWM system. The elastomer body 12 seals against opposing sealing surfaces 108 and 110 of the inner and outer components 104 and 106. Because a radial width 112 of the annular bore 102 is less than the radial width 42 of the elastomer body 12 when relaxed, the opposing sealing surfaces 108 and 110 compress the elastomer body 12 to an energized state. The radial width 44 of the metal end caps 14 is less than the radial width 112 of the annular bore 102, however, and the parallel outer and inner arms 32 and 34 of the metal end caps 14 do not collapse during installation. This limits strain around the metal end caps 14 and stress on the bond interfaces 26. Additionally, with the conventional seal 60, the metal end caps 64 are designed as having an interference fit with a critical sealing surface (e.g., of a piston or rod). For instance, for use as a piston seal, the outer edges of the metal end caps 64 (e.g., outer arms 82) can expand outward to interfere with the inner diameter surface of an outer pipe surrounding the seal. With the design of seal 10, however, the arms 32 and 34 of the metal end caps 14 are parallel to the sealing surface and do not use an interference fit. As such, the design of seal 10 may be equally capable of functioning in a piston seal application as a rod seal application, whereas with a more conventional MEC seal design like seal 60, separate designs specific to each of these applications would be used.

In some embodiments, including that depicted in FIG. 3, the metal end caps 14 include large-radial corners (bends 36 and 38) that transition from the outer and inner arms 32 and 34 to the base portions 30. Some previous metal end cap seals have metal end caps with curved corners (e.g., seal 60 in FIG. 4) but with significantly smaller radii of curvature creating a tighter transition between the connected portions of the metal end caps. The larger radii of curvature for bends 36 and 38 may smooth strains across the transition zone, particularly as the metal end caps 14 deform from pressure or thermal expansion in operation. In some embodiments, the ratio of the radial width 44 of the metal end caps 14 to the radius of curvature of the outer edge of each of the bends 36 and 38 is no more than five-to-one, no more than four-to-one, or no more than three-to-one. These radii of curvature of the bends 36 and 38 are identical in at least some embodiments. And in one embodiment the ratio of the radial width 44 to the radius of curvature of each of the bends 36 and 38 is three-to-one. These larger radii of curvature reduce strain at the bond interfaces 26, which facilitates the use of FFKM for the elastomer body 12 of the seal 10.

Another design consideration is how the metal end caps inhibit extrusion of the elastomer between the metal end caps and opposing sealing surfaces. As discussed above, the metal end caps of some conventional designs deform inwardly during installations and, from the resulting spring effect, are inclined to push out against the opposing sealing surfaces. In the design represented by seal 10, however, the metal end caps 14 do not deform during installation so do not have a natural tendency to expand against the opposing sealing surfaces. Instead, the metal end caps 14 expand outwards under pressurization to block the extrusion path between the metal end caps and opposing sealing surfaces. One or more design features can be used to facilitate such expansion without generating high strain at the bond interfaces 26. For instance, the outer and inner surfaces of the elastomer body 12 include transition surface portions 50 and 52 that are not convex surfaces. In at least some embodiments, these transition surface portions 50 and 52 extend axially from the convex surfaces 20 and 22 to the metal end caps 14 and relieve strain around the metal end caps 14 from compression of the elastomer body 12. The ends of the convex surfaces 20 and 22 can have smooth tapers into the transition zones to further relieve the strain. The large radii of curvature at bends 36 and 38 also facilitate expansion of the outer and inner arms 32 and 34 to meet the opposing sealing surfaces whilst generating minimal strains. With these features in at least some embodiments, under pressure the elastomer encapsulated by the metal end caps 14 is predominantly under a volumetric type loading with little to no deviatoric strains generated at the bond interfaces 26 despite the expansion of the metal end caps 14.

Figure 6:
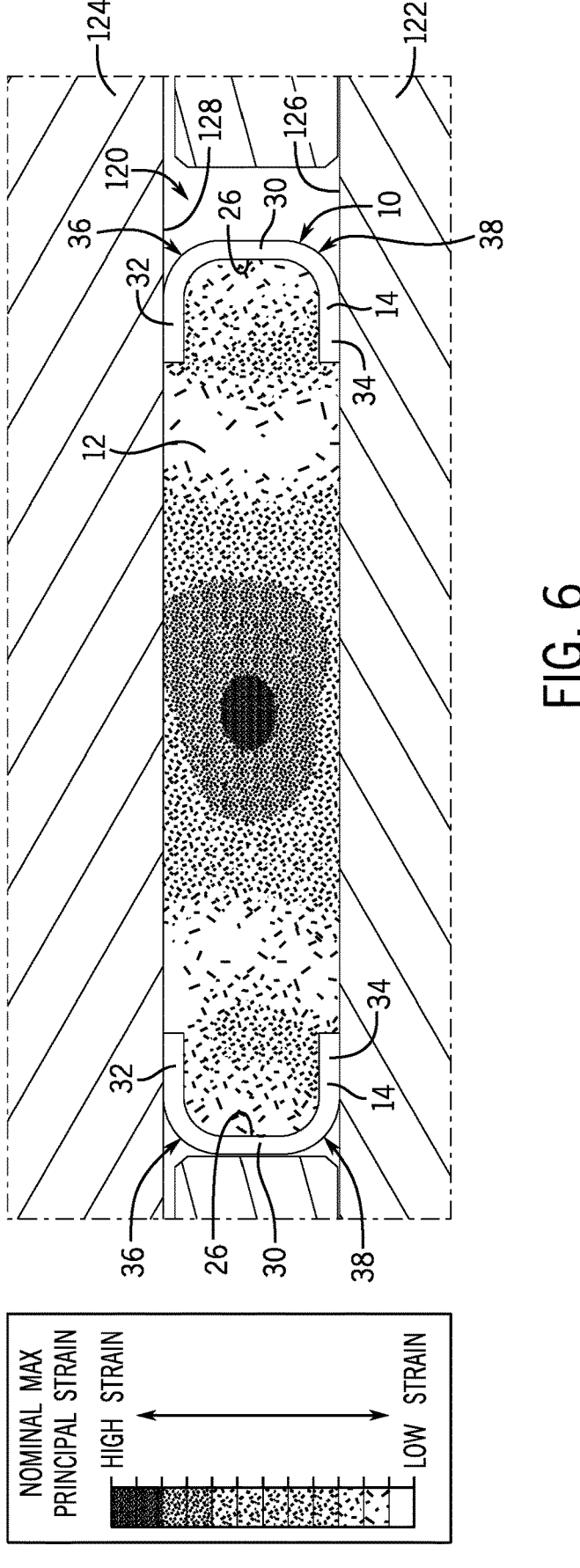
FIG. 6 depicts a strain profile for the metal end cap seal of FIGS. 1-3 in accordance with one embodiment.
Figure 7:
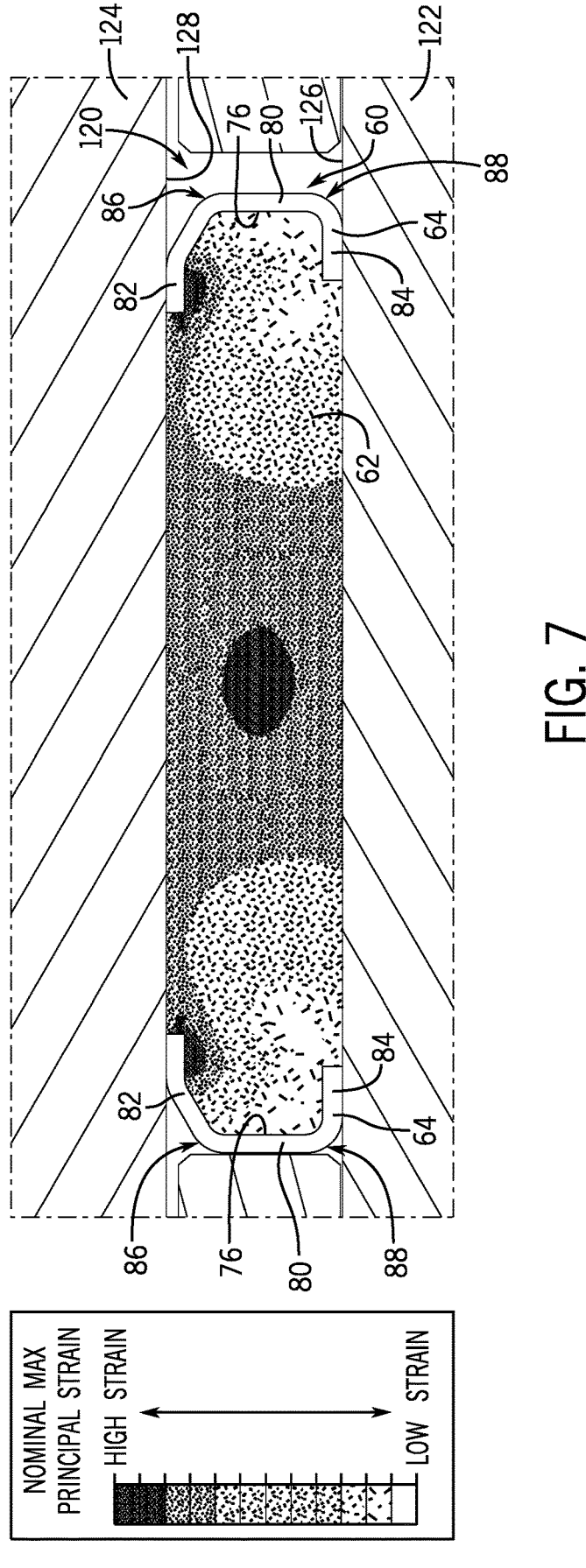
FIG. 7 depicts a strain profile for the more conventional metal end cap seal of FIG. 4.

By way of comparison, a maximum principal nominal strain field through a cross-section of the metal end cap seal 10 of FIG. 3 is depicted in FIG. 6, while a maximum principal nominal strain field through a cross-section of the more conventional metal end cap seal 60 of FIG. 4 is depicted in FIG. 7. The depicted strain fields were generated with a Finite Element Analysis (FEA) model. For this comparison, the seals' maximum cross-sectional thickness and overall volume were kept the same so that both seals had the same squeeze and gland-fill once installed.

Through this simulation the seals 10 and 60 were first installed into an annular gland 120 (between a sealing surface 126 of an inner component 122 and a sealing surface 128 of an outer component 124), thermally expanded to a maximum temperature reasonable for an FFKM application, and then pressured from both annuli. After the pressures were bled, the strain profile through the seals 10 and 60 could then be compared. As shown in FIGS. 6 and 7, the principal strains in the bond interface region are significantly lower with the seal 10 compared to the more conventional style seal 60. In particular, the strains are significantly lower around the outer face of seal 10 (e.g., near outer arms 32)

than for the outer face of seal 60, with the strain field of FIG. 7 showing a high chance of fracture or de-bonding with the more conventional design.

Figure 8:
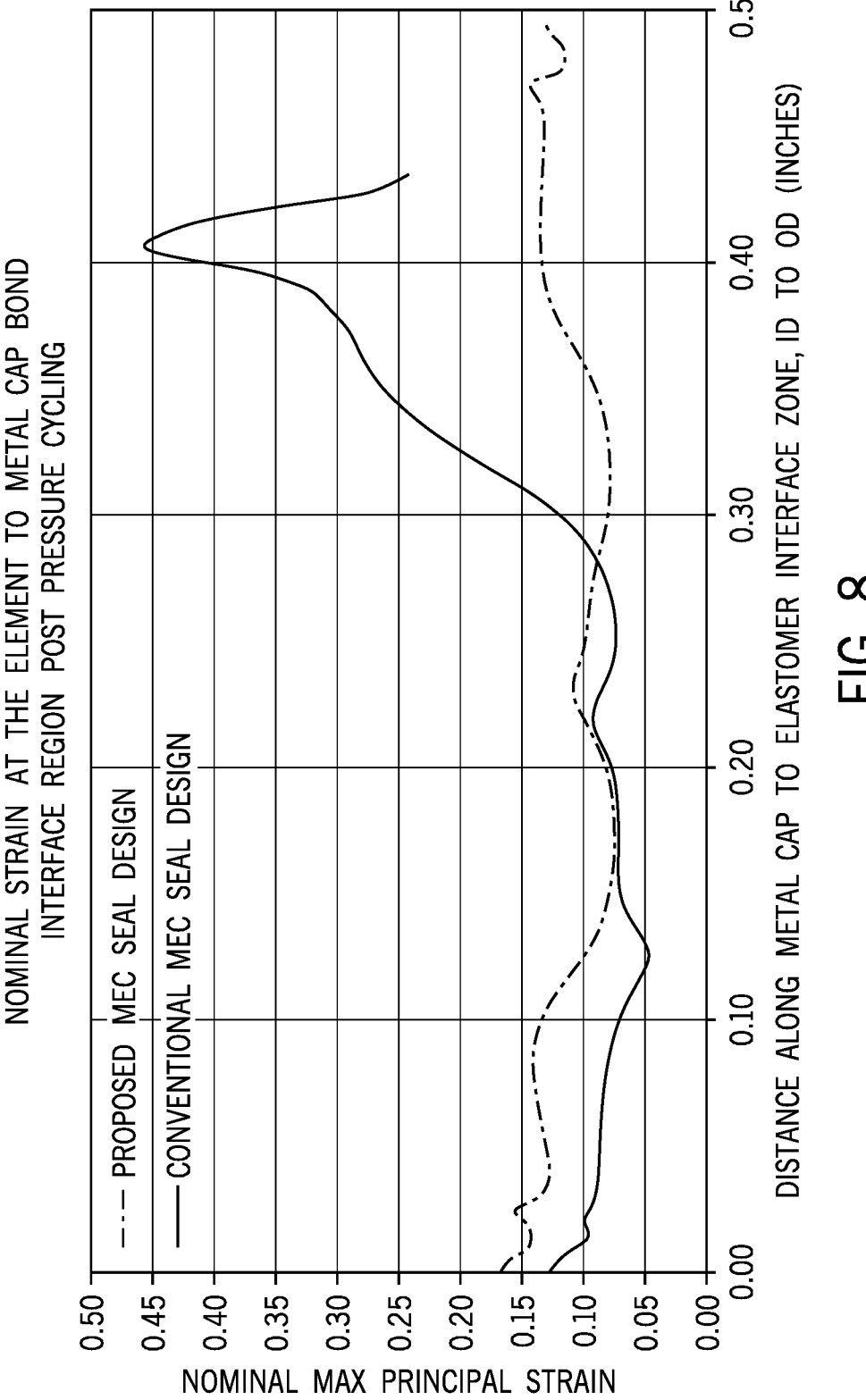
FIG. 8 is a graph comparing strains along bond interfaces for the metal end cap seals depicted in FIGS. 6 and 7 in accordance with one embodiment.

A helpful way to view this is by considering a path along each of the bond interface 26 and 76 between the respective metal end caps and elastomer bodies of the two designs and plotting the strains. To this end, FIG. 8 depicts a maximum principal nominal strain along the bond interfaces for the proposed MEC seal design of FIG. 6 and for the more conventional MEC seal design of FIG. 7, measuring along the bond interface from the distal end of the inner arm to the distal end of the outer arm for each seal design. These strains are shown in FIG. 8 for the deformation states shown in FIGS. 6 and 7. As may be seen in FIG. 8, the proposed design of seal 10 has significantly lower strains at the interface compared to the conventional design of seal 60. With the proposed design of seal 10 the average strain was found to be around 0.115 with a peak strain of 0.167. Thus, in at least one embodiment, the peak strain at the bond interface 26 is less than fifty percent greater than the average strain at the bond interface 26. For the conventional design of seal 60 the average strain was found to be around 0.142 with a peak strain of 0.455, which is more than two hundred percent higher than the average strain. As such, the proposed design of seal 10 shows significant improvement in both the average strain and the peak strain relative to the conventional design of seal 60.

From the foregoing description, it will be appreciated that the seal 10 includes design features that minimize the strains at the bond interfaces 26 between the metal end caps 14 and the elastomer body 12. Reducing strains in this region enables use of more chemically resistant elastomers, such as FFKMs, in metal end cap seals. In at least some embodiments, metal end cap seals include FFKMs and the reduction in strain at the bond interference prevents de-bonding, despite the weak bond strength achieved for these compounds. The manufacture of metal end cap seals using extremely chemically resistant compounds, such as FFKM, may provide significant benefits in terms of long-term sealing performance at elevated temperatures and pressures.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A metal end cap seal comprising:
two metal end caps, each metal end cap including:
an inner arm forming a portion of an inner surface of the metal end cap seal;
an outer arm forming a portion of an outer surface of the metal end cap seal;
a base connecting the inner arm to the outer arm;
a first bend having a first radius of curvature from the base to the outer arm;
a second bend having a second radius of curvature from the base to the inner arm; and
a radial width measured from the inner surface at the inner arm to the outer surface at the outer arm; and
a central elastomer component bonded to the metal end caps, wherein the central elastomer component comprises FFKM;
wherein the first and second radii of curvature of each metal end cap are configured to hinder debonding of the central elastomer component from the metal end caps during use, each of the first and second radii of curvature determined by a ratio of the radial width to the corresponding first or second radius of curvature being no more than five-to-one.

2. The metal end cap seal of claim 1, wherein the central elastomer component has an annular body with an outer circumferential surface and an inner circumferential surface, and the two metal end caps are bonded to opposite axial ends of the central elastomer component.

3. The metal end cap seal of claim 1, wherein each of the two metal end caps has a uniform thickness across the inner arm, the base, and the outer arm.

4. The metal end cap seal of claim 1, wherein the inner arm and the outer arm are parallel to one another when the metal end cap seal is in a relaxed state.

5. The metal end cap seal of claim 4, wherein the inner arm and outer arm are perpendicular to a radius of the metal end cap seal when the metal end cap seal is in the relaxed state.

6. The metal end cap seal of claim 1, wherein each of the first and second radii of curvature is determined by the ratio of the radial width to the corresponding first or second radius of curvature being no more than three-to-one.

7. The metal end cap seal of claim 1, wherein the central elastomer component includes:
a radially outward facing surface that includes:
a first axially convex portion;
a first transition portion extending axially from the first axially convex portion to a first metal end cap of the two metal end caps; and
a second transition portion extending axially from the first axially convex portion to a second metal end cap of the two annular metal end caps;
wherein the first transition portion and the second transition portion of the radially outward facing surface are not axially convex surfaces; and
a radially inward facing surface that includes:
a second axially convex portion;
a third transition portion extending axially from the second axially convex portion to the first metal end cap; and a fourth transition portion extending axially from the second axially convex portion to the second metal end cap;

wherein the third transition portion and the fourth transition portion of the radially inward facing surface are not axially convex surfaces.

8. The metal end cap seal of claim 7, wherein the first and second radii of curvature of each of the first and second metal end caps are configured to alleviate strains across the first, second, third, and fourth transition portions as the first and second metal end caps deform from pressure or thermal expansion in operation.

9. A metal end cap seal comprising:

an annular elastomer body comprising FFKM; and two annular metal end caps bonded to opposite axial ends of the annular elastomer body, wherein each of the two metal end caps includes an inner arm forming a portion of an inner surface of the metal end cap seal, an outer arm forming a portion of an outer surface of the metal end cap seal, a base connecting the inner arm to the outer arm, a first bend having a first radius of curvature from the base to the outer arm, a second bend having a second radius of curvature from the base to the inner arm, and a radial width measured from the inner surface at the inner arm to the outer surface at the outer arm, and wherein the inner arm and the outer arm are parallel to one another when the metal end cap seal is in a relaxed state;

wherein the first and second radii of curvature of each metal end cap are configured to hinder debonding of the elastomer from the metal end caps during use, each of the first and second radii of curvature being determined by a ratio of the radial width to the corresponding first or second radius of curvature being no more than four-to-one.

10. The metal end cap seal of claim 9, wherein the annular elastomer body includes a radially outward facing surface that includes: an axially convex portion; a first transition portion extending axially from the convex portion to a first metal end cap of the two annular metal end caps; and a second transition portion extending axially from the convex portion to a second metal end cap of the two annular metal end caps; wherein the first transition portion and the second transition portion of the radially outward facing surface are not axially convex surfaces.

11. The metal end cap seal of claim 10, wherein the annular elastomer body includes a radially inward facing surface that includes: an axially convex portion; a first transition portion extending axially from the convex portion to the first metal end cap; and a second transition portion extending axially from the convex portion to the second metal end cap; wherein the first transition portion and the second transition portion of the radially inward facing surface are not axially convex surfaces.

12. The metal end cap seal of claim 9, wherein the outer arm of each metal end cap extends linearly from the first bend to a distal end of the metal end cap at the outer surface of the metal end cap seal and the inner arm of each metal end cap extends linearly from the second bend to a distal end of the metal end cap at the inner surface of the metal end cap seal.

13. The metal end cap seal of claim 9, wherein the metal end cap seal is configured to seal an annular space between an inner body and an outer body such that the inner surface of the metal end cap seal seals against a sealing surface of the inner body and the outer surface of the metal end cap seal seals against a sealing surface of the outer body, and the metal end cap seal is configured such that the inner arm and outer arm of each of the two metal end caps are parallel to the sealing surface of the inner body and to the sealing surface of the outer body during installation of the metal end cap seal into the annular space.

14. The metal end cap seal of claim 9, each of the first and second radii of curvature is determined by the ratio of the radial width to the corresponding first or second radius of curvature being no more than three-to-one.

15. The metal end cap seal of claim 11, wherein the first and second radii of curvature of each of the first and second metal end caps are configured to alleviate strains across the first and second transition portions of the radially outward facing surface and the first and second transition portions of the radially inward facing surface as the first and second metal end caps deform from pressure or thermal expansion in operation.

16. A method comprising:

providing a metal end cap seal including an annular elastomer body, the annular elastomer body comprising FFKM, and two annular metal end caps bonded to opposite axial ends of the annular elastomer body, wherein each of the two metal end caps includes an inner arm forming a portion of an inner surface of the metal end cap seal, an outer arm forming a portion of an outer surface of the metal end cap seal, a base connecting the inner arm to the outer arm, a first bend having a first radius of curvature from the base to the outer arm, a second bend having a second radius of curvature from the base to the inner arm, and a radial width measured from the inner surface at the inner arm to the outer surface at the outer arm, and wherein the inner arm and the outer arm are parallel to one another when the metal end cap seal is in a relaxed state;

wherein the first and second radii of curvature of each metal end cap are configured to hinder debonding of the elastomer from the metal end caps during use, each of the first and second radii of curvature being determined by a ratio of the radial width to the corresponding first or second radius of curvature being no more than four-to-one; and installing the metal end cap seal into an annular space between an inner oilfield component and an outer oilfield component.

17. The method of claim 16, wherein the two metal end caps do not deform during the installing of the metal end cap seal into the annular space.

18. The method of claim 16, wherein the radial width of each of the two metal end caps is less than a radial width of the annular space.

19. The method of claim 18, comprising exposing the metal end cap seal to pressure such that the two metal end caps expand radially between opposing sealing surfaces of the inner and outer oilfield components to block extrusion of the annular elastomer body along the opposing sealing surfaces.

* * * * *